US008818883B2

(12) United States Patent
Lawrence et al.

(10) Patent No.: US 8,818,883 B2
(45) Date of Patent: Aug. 26, 2014

(54) PERSONALIZED SHOPPING AVATAR

(75) Inventors: Cindy Lawrence, University Place, WA (US); Victor Tiscareno, Issaquah, WA (US); Stanley Ng, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 850 days.

(21) Appl. No.: 12/508,353

(22) Filed: Jul. 23, 2009

(65) Prior Publication Data

US 2011/0022965 A1 Jan. 27, 2011

(51) Int. Cl.
*G06Q 30/00* (2012.01)
(52) U.S. Cl.
USPC ............ 705/27.2; 705/27.1; 705/26.1
(58) Field of Classification Search
USPC .................... 705/26–27, 26.1–27.2
See application file for complete search history.

(56) References Cited

U.S. PATENT DOCUMENTS

| | | | | |
|---|---|---|---|---|
| 5,495,568 A * | 2/1996 | Beavin | ............................. | 700/83 |
| 7,079,158 B2 | 7/2006 | Lambertsen | | |
| 7,083,278 B2 | 8/2006 | Broderick et al. | | |
| 7,194,327 B2 | 3/2007 | Lam | | |
| 8,189,000 B2 * | 5/2012 | Weaver | ........................ | 345/420 |
| 2001/0026272 A1 * | 10/2001 | Feld et al. | ..................... | 345/419 |
| 2004/0039592 A1 * | 2/2004 | Shima | ............................... | 705/1 |
| 2008/0163054 A1 * | 7/2008 | Pieper et al. | ................. | 715/706 |
| 2009/0089186 A1 * | 4/2009 | Paolini | ........................... | 705/27 |

FOREIGN PATENT DOCUMENTS

| | | |
|---|---|---|
| WO | WO2006108279 | 10/2006 |
| WO | WO2008145952 | 12/2008 |

OTHER PUBLICATIONS

Editors, B. (Nov. 16, 1998). My virtual model-tm launched by public technologies multimedia. Business Wire. Retrieved from http://search.proquest.com/docview/446771548?accountid=14753.*

* cited by examiner

*Primary Examiner* — Kathleen G Palavecino
(74) *Attorney, Agent, or Firm* — Novak Druce Connolly Bove + Quigg LLP (57) ABSTRACT

This is directed to a personalized avatar providing a true representation of the user's body, such that the avatar provides a substantially accurate graphical representation of the user's body. The avatar can be defined using any suitable approach, including by providing measurements of the user's body or extracting measurements from photographs of the user. The user can direct an electronic device to apply selected articles of clothing, accessories, or other items to the user's avatar to preview the appearance of the items on the user. In some embodiments, an electronic device can recommend different clothing items or other objects based on the user's body type.

16 Claims, 5 Drawing Sheets

PERSONALIZED SHOPPING AVATAR

BACKGROUND OF THE INVENTION

This is directed to a personalized shopping avatar for allowing a user to preview clothing and accessories on an avatar substantially matching the user's body. The avatar, with clothing or accessories overlaid, can be shared with other users for comments or advice.

Many users shop for clothing, accessories, or other objects that the user may wear in physical stores, where the users may actually try on the objects to purchase. Other users may shop for the same objects remotely, for example by catalog or over the Internet, and purchase items without first trying them on. Once the users receive the items from the retailer, the users can try the items and then decide whether or not to keep them. To entice users to purchase items remotely, many retailers or providers pay return shipping for the user to return goods that are not of interest.

Purchasing goods remotely, however, may not be convenient or easy for the user. In particular, a user may be required to guess or know what size to buy, or may need to buy each item in two or more sizes to ensure that the proper size is purchased. This, in turn will force the user to return at least some of the purchased items. In addition, a user may be forced to rely on static images of the clothing or accessories, or images of the clothing or accessories on models selected by the retailer. In particular, there is no easy way for the user to see what an article of clothing or an accessory will look like on the user's own body.

SUMMARY OF THE INVENTION

This is directed to systems, methods and computer-readable media for providing a personalized avatar for previewing articles wearable by the avatar. The avatar dimensions, shape and general appearance can be defined to substantially match those of a user, such that articles of clothing, accessories or other objects placed on the avatar can substantially represent how the articles would appear on the user.

In some embodiments, a user can shop for articles of clothing, accessories or other objects that the user can wear or hold. When the user shops remotely for such items, for example over the Internet, the user may not be able to preview how the items will look on the user before purchasing. This can also prevent the user from trying different sizes of an item to pick the most appropriate size. One solution may be for the user to first go to a store to identify the specific items of interest (e.g., model, color and size for an article of clothing), and subsequently purchase the identified items remotely. This solution, however may defeat the very purpose of remote purchasing—viz., to avoid going to a store.

Another solution can be to define a personalized avatar providing a true representation of the user's body. For example, the avatar can be defined to have the user's skin tone, facial features, body measurements (e.g., hips, waist, shoulders) such that the avatar provides a substantially accurate graphical representation of the user's body. The avatar can be defined using any suitable approach. For example, the user can provide measurements of the user's body to an electronic device defining the avatar. As another example, the user can provide one or more pictures of the users from which an electronic device can extract relevant measurements and define the avatar. As still another example, the avatar can be defined from clothing and other accessories that the user owns and wears. In particular, the electronic device can retrieve metadata associated with the user's clothing to identify measurements of the user.

To shop remotely, the user can direct an electronic device to apply selected articles of clothing, accessories, or other items to the user's avatar. Using metadata and fixed points of the avatar and objects, the electronic device can place the user's selected objects on the avatar. The material used for the selected objects can stretch or sag in a manner representative of the manner the object may be worn by the user. For example, metadata associated with the selected item can specify the manner in which the item is worn. In some embodiments, a user can simultaneously select several items to wear such that the several items are overlaid on the avatar (e.g., clothing metadata defines how a shirt worn over a t-shirt will appear).

In some embodiments, an electronic device can recommend different clothing items or other objects based on the user's body type. For example, the electronic device can access a database of clothing items purchased by users having different avatars, and recommend clothing based on what users having similar avatars purchased. In addition, one or more retailers can provide recommendations to a user based on the user's avatar. Once a user has applied one or more objects to an avatar, the user can share the avatar, with the objects, to other users or friends to receive the friend's recommendations or comments regarding the proposed outfit or look.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to creating a personalized avatar designed to accurately represent the user's body. The avatar can be covered with different clothing items, accessories, or other objects, such that the user can observe how the objects would appear had the user actually tried on the objects.

Figure 1:
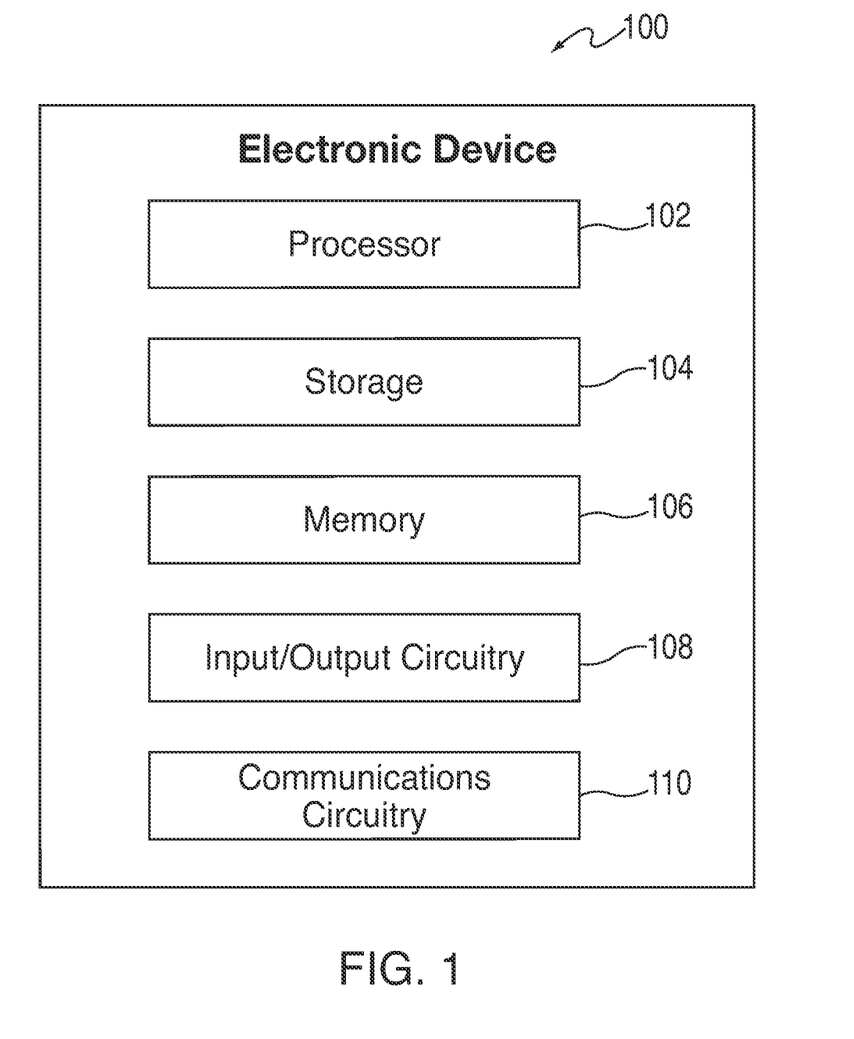
FIG. 1 is a schematic view of an illustrative electronic device for displaying an avatar in accordance with one embodiment of the invention.

The user can display the avatar using any suitable electronic device. FIG. 1 is a schematic view of an illustrative electronic device for displaying an avatar in accordance with one embodiment of the invention. Electronic device 100 can include any suitable type of electronic device operative to display an avatar to a user. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a music recorder, a video recorder, a gaming device, a camera, and any other portable electronic device having a display on which an avatar created by the user can be displayed.

Electronic device 100 can include a processor or control circuitry 102, storage 104, memory 106, input/output circuitry 108, and communications circuitry 110 as typically found in an electronic device of the type of electronic device 100, and operative to enable any of the uses expected from an electronic device of the type of electronic device 100 (e.g., connect to a host device for power or data transfers). In some embodiments, one or more of electronic device components 100 can be combined or omitted (e.g., combine storage 104 and memory 106), electronic device 100 can include other components not combined or included in those shown in FIG. 1 (e.g., positioning circuitry or motion detection circuitry), or electronic device 100 can include several instances of the components shown in FIG. 1. For the sake of simplicity, only one of each of the components is shown in FIG. 1.

Control circuitry 102 can include any processing circuitry or processor operative to control the operations and performance of electronic device 100. Storage 104 can include, for example, one or more storage mediums including a hard-drive, solid state drive, flash memory, permanent memory such as ROM, any other suitable type of storage component, or any combination thereof. Memory 106 can include cache memory, semi-permanent memory such as RAM, and/or one or more different types of memory used for temporarily storing data. In some embodiments, memory 106 and storage 104 can be combined as a single storage medium. Input/output circuitry 108 can be operative to convert (and encode/decode, if necessary) analog signals and other signals into digital data. Input/output circuitry 108 can be coupled to or include any suitable input mechanism, such as for example, a button, keypad, dial, a click wheel, or a touch screen, as well as any suitable output circuitry associated with output devices (e.g., audio outputs or display circuitry or components). Communications circuitry 110 can include circuitry for connecting to a communications network and to transmitting communications (e.g., voice or data) to other devices within the communications network using any suitable communications protocol (e.g., Wi-Fi, Bluetooth®, radio frequency systems, infrared, GSM, GSM plus EDGE, CDMA, quadband, and other cellular protocols, VOIP, or any other suitable protocol).

In some embodiments, electronic device 100 can include a bus operative to provide a data transfer path for transferring data to, from, or between control processor 102, storage 104, memory 106, input/output circuitry 108, communications circuitry 110, and any other component included in the electronic device.

Using the electronic device, a user may wish to remotely shop for articles of clothing, accessories, or other objects that the user can wear or hold. Because the user may not be shopping in a store, the user may not be able to try on different the objects, and may therefore not know, until after the purchase, whether the user likes the look of the purchased objects. Some online retailers can provide images of the objects to allow the user to have a preliminary view of the objects. In some cases, a retailer can provide a standard, single model on which different clothing can be applied. For example, a user can choose to apply different pants or shirts on a single size template to preview specific outfits. This approach, however, may be limited as the user's body, skin color, and face may not match those of the model template.

To assist the user in more accurately previewing objects to be worn, the electronic device can provide the user with a personalized avatar on which the user can apply clothing, accessories, or other objects. To ensure that the avatar reflects the user's appearance, the avatar's proportions and dimensions can be selected to match those of the user. For example, the avatar arm length and circumference, shoulder width, waist, thighs, legs, and other characteristic portions can be selected to match those of the user. In addition, the avatar skin tone can be selected to match the user's skin tone. In some embodiments, components of the avatar's face can be adjusted to match those of the user (e.g., nose shape and size, eye position, hair color). Alternatively, a photo of the user can be used for the avatar face.

Figure 2:
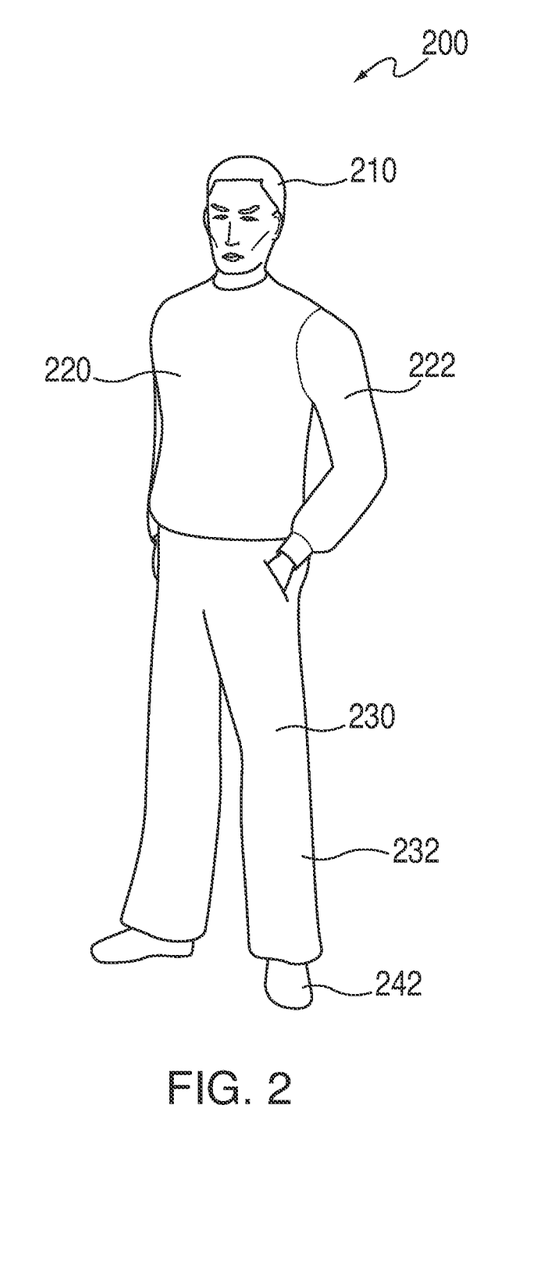
FIG. 2 is a schematic view of an illustrative avatar displayed by the electronic device in accordance with one embodiment of the invention.

FIG. 2 is a schematic view of an illustrative avatar displayed by the electronic device in accordance with one embodiment of the invention. Avatar 200 can include face 210, upper body 220 and lower body 230. The user can, using the electronic device displaying avatar 200, spin, rotate or move avatar 200 to view the avatar from any perspective. For example, the user can flick a touch screen display, or provide any other input for changing the user's perspective of the avatar. Avatar 200 can include any suitable clothing or other accessories, such as shirt 222 over upper body 220, pants 232 over lower body 230, and shoes 242. Avatar 200 can include any other suitable clothing item, garment, accessory, or other wearable object, including for example jewelry, bags, scarves, watches, glasses or other eyewear, hats, or any other object.

Figure 3:
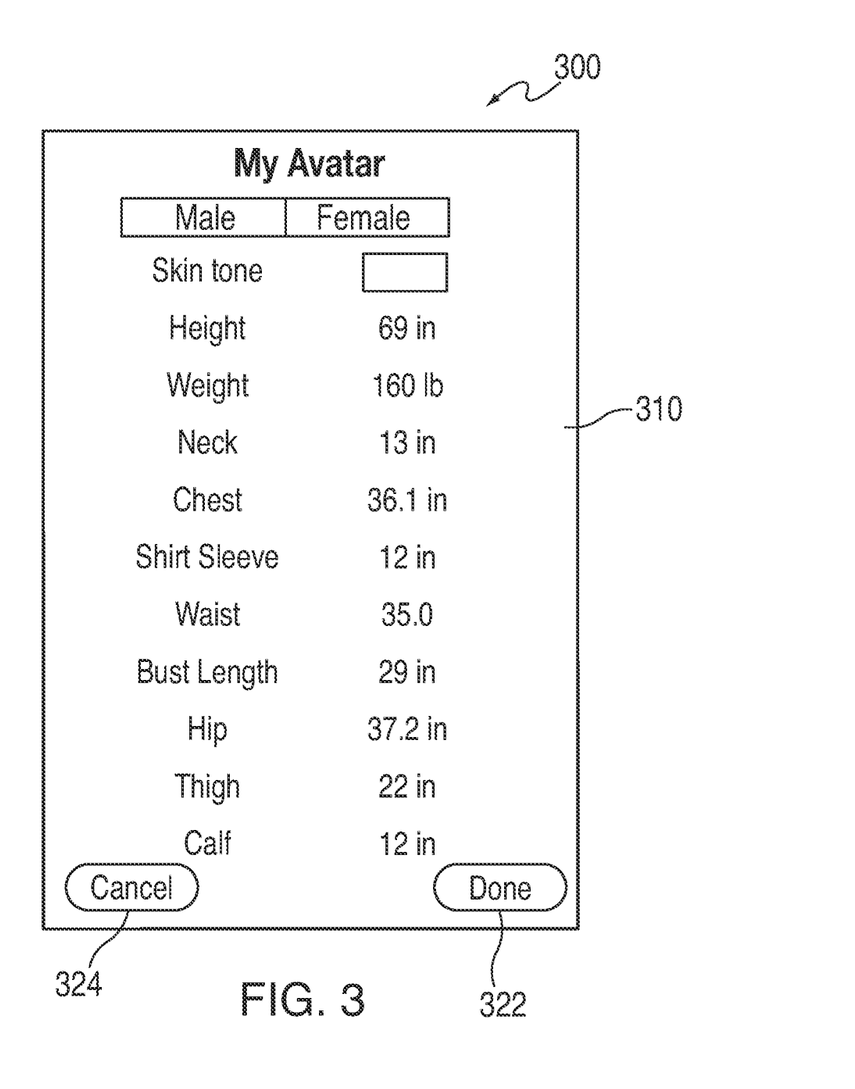
FIG. 3 is a schematic view of an illustrative display for building an avatar based on a user's personal measurements.

The user can generate avatar 200 using any suitable approach. In particular, because avatar 200 may be of most use only when it actually corresponds to the user's body, the user may have an incentive to provide information to the device for generating an accurate avatar. In one approach, the user can provide a number of body measurements to the electronic device. For example, the user may measure several representative dimensions of his body, and provide those measurements to the device. FIG. 3 is a schematic view of an illustrative display for building an avatar based on a user's personal measurements. Display 300 can include listing 310 of measurements and other information that the user can provide to define the user's body. For example, the user can specify whether the user is male or female, the user's skin tone (e.g., by selecting a tone from a palette of available colors), and body measurements such as height, weight, neck, chest, shirt sleeve, waist, bust length, hip, thigh, and calf measurements. The electronic device can direct the user to provide other measurements instead of or in ad addition to the measurements listed above (e.g., back width, back length, waist to underarm, wrist to underarm, armhole depth, one shoulder). In some embodiments, some or all of these measurements may not be necessary to generate an accurate avatar. Once the user has entered appropriate measurements, the user can select done option 322 to instruct the device to generate an avatar, or cancel option 324 to cancel the operation.

The user can personalize the face of the avatar using any suitable approach. In some embodiments, the user can provide facial measurements and colors using a display similar to display 200. Alternatively, the user can provide one or more photographs to the electronic device, such that the electronic device can map the features of the photographs to the avatar skin. In some embodiments, the electronic device can instead or in addition use the provided photographs as the avatar face. In some embodiments, the electronic device can use elements of provided photographs to refine the avatar, including for example the user's skin tone based on the skin color of the photograph. The avatar face can be defined such that the user can apply eye wear or other objects to the avatar face.

In some embodiments, the user may not have an opportunity or the ability to perform the necessary measurements to generate the avatar. To generate the avatar, the user can instead or in addition provide one or more photographs or images of the user to the electronic device. The electronic device can analyze the images provided to determine the appropriate ratio of characteristic body measurements. For example, the electronic device can determine the ratio of lengths of the user's arm to the user's torso or legs. In some embodiments, the electronic device can determine an absolute or exact value for dimensions of the user's body by comparing the body lengths with known lengths in an image (e.g., relative to a known car length in the image, or other object in the image). The electronic device can use any suitable number of images to generate an avatar, including for example several images from different angles. In some embodiments, the electronic device can direct the user to provide images with the user in specific positions, or from specific angles (e.g., direct the user to provide front and profile images).

The electronic device can identify specific body parts of the user from the photographs using any suitable approach. In some embodiments, the user can apply targets to a photograph, where each target specifically identifies a body part (e.g., providing targets on the elbows, shoulders, and wrist of a photograph). Alternatively, the electronic device can automatically apply targets to the photographs, and prompt the user to approve or correct the positioning of the targets. The targets can be applied using any suitable approach, including for example by touching or selecting portions of the photographs.

Because photographs of a user will typically include clothing of varying degrees of tightness, the electronic device may need to account for the tightness or looseness of the clothing. To assist the device, the user can provide identifying information to the device, including for example the manufacturer or retailer of the clothing, the model and the size. Using that information, the electronic device can determine a corrective factor for the body measurements. In some embodiments, the electronic device can automatically identify the clothing information, for example by providing the photographs to a server having a database of known clothing against which the photograph can be compared. In some embodiments, time stamps or other timing information can be used to limit the search of known clothing (e.g., only search for clothing that was sold within 2 years from the image time stamp).

In some embodiments, the electronic device can generate an avatar for the user based on clothing owned or tried on by the user. The user can identify some or all of the clothing owned by the user by entering identifying information (e.g., manufacturer, model number, size). Alternatively, the user can provide images or photographs of individual clothing items to the electronic device, which the electronic device can in turn identify or provide to a remote server for identification. Using the characteristic measurements of the user's clothing, the electronic device can define an avatar matching the user's body.

In some embodiments, a combination of two or more of these approaches can be used to define an avatar. For example, an image or photograph can be used to define the user's face and skin tone, pants and other lower body clothing can be used to define the lower body of the avatar, and measurements of the user can be used to define the upper body of the avatar. The measurements and photographs can be of particular interest to accurately define curved surfaces of the avatar.

Using the avatar, the user can select clothing articles, accessories, or other objects from an online store, and direct the electronic device to overlay the selected objects on the avatar. As another example, a user can retrieve a photograph of an object (e.g., taken with the electronic device camera) to apply to an avatar. The shape and color of the object and be determine from the photograph, in particular if a color calibrated camera is used (e.g., chroma-matching already captured metadata). The electronic device can determine the manner in which to overlay images of the objects using any suitable approach. In some embodiments, the objects can include metadata defining specific portions of the objects, and the position at which the specific portions are to be placed on the avatar. For example, a shirt can include metadata specifically defining the portions of the shirt that are to rest on the avatar shoulders, and around the avatar neck. The objects can include information specifying how much material is available in the object, and how the object will stretch or sag on the avatar.

In some embodiments, the user can direct the electronic device to place an object on a particular section of the avatar. For example, the user can drag an object around a portion of the avatar (e.g., drag a scarf around an avatar neck, head and waist). As another example, the user can select a position for an object from several positions on the avatar (e.g., set in a menu). In some embodiments, the user can select a position on the avatar for which the object has no metadata defining how to apply the object on the avatar. The electronic device can then, based on the position the user selects for the object, define corresponding metadata for future use.

Figure 4:
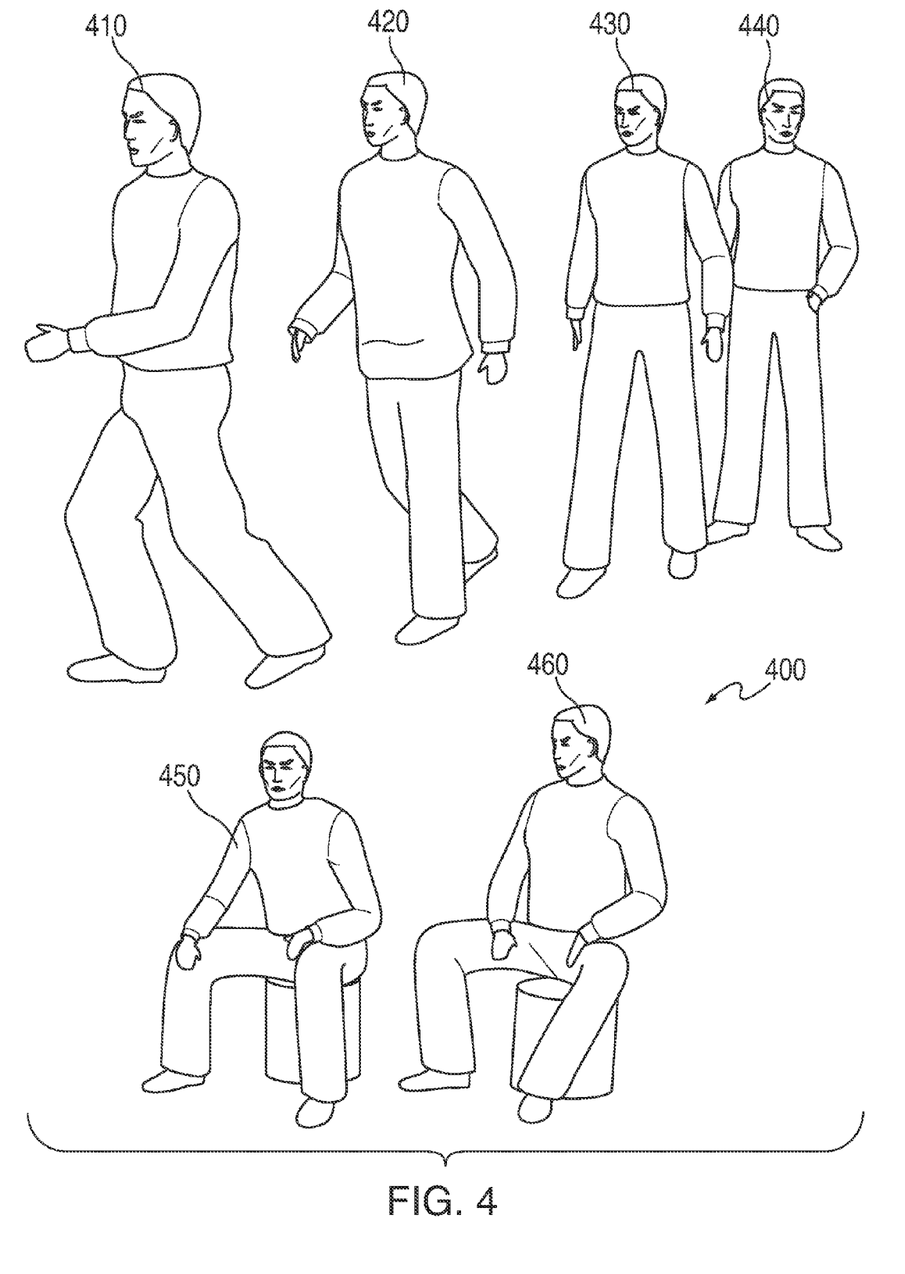
FIG. 4 is a schematic view of an avatar as the avatar moves in accordance with one embodiment of the invention.

In some embodiments, the objects that a user may apply to the avatar can include metadata or other information defining the manner in which the objects will move and change when the avatar moves. For example, a user may direct the avatar to sit down, walk, run, bend, move arms or legs, or move in any other way to preview the appearance of objects as the user moves. FIG. 4 is a schematic view of an avatar as the avatar moves in accordance with one embodiment of the invention. The user can direct the avatar to move in any suitable manner, including for example by selecting and moving (e.g., dragging) particular elements of the avatar (e.g., drag an arm or a leg) using an input interface (e.g., a touchscreen). Alternatively, the electronic device can include one or more pre-existing configurations in which a user can select to position the avatar. The configurations can be selected in any suitable manner, including for example from a listing or menu. Display 400 includes several avatars 410, 420, 430, 440, 450 and 460 in different configurations. As shown in display 400, the position of the pant leg relative to the bottom of the user's foot changes from avatar 410, when the avatar is standing, to avatar 460, when the avatar is sitting down. Although several are shown simultaneously displayed in display 400, it will be understood that only a limited number of avatars can be displayed at once (e.g., one or two). In some embodiments, display 400 can include an animation of the avatar moving from the positions shown (e.g., starting seated with avatar 460 and ending as the avatar walks with avatar 410). The user can rotate, tilt, pan, or otherwise move display 400 to see the avatar under a different configuration than that initially shown (e.g., see the avatar from the front or back, instead of from the side).

The user can place any suitable number of objects on the avatar. For example, the electronic device can place several layers of clothing on the avatar, as well as jewelry or other accessories on top of the clothing. The electronic device can layer the clothing such that the thickness of the displayed clothing reflects the several layers. In some embodiments, the electronic device can determine, for example based on metadata defining the thickness of each layer, friction between layers, and the tightness of each layer, the manner in which the layers will move relative to each other as the avatar moves. For example, the avatar can have a different appearance when a loose outer layer (e.g., a coat) is placed over a shirt than when a tighter outer layer (e.g., a sweater) is placed over a shirt.

In some embodiments, the amount of material and the position of the material can change for an item based on the selected size. To assist the user in selecting clothing, the electronic device can automatically select an appropriate size of clothing for a user. For example, the electronic device can determine the user's characteristic measurements, and compare those measurements to the measurements associated with each size of a particular item. From the comparison, the electronic device can select the most appropriate size. If several items are layered, the electronic device can select a size based on the layered or non-layered use of the particular item. For example, the electronic device can prompt the user that, when used in a layered configuration (for example applied to the avatar by the user), the appropriate size for the selected item is not the same as when the user wears the item without layers. The user can then preview different outfits with both sizes, using other objects to create different layers, to determine the most appropriate size based on the user's expected use of the item.

Using the avatar, an electronic device can recommend clothing, accessories, or other objects to a user. For example, the electronic device can recommend clothing not only based on selected items, but also based on the user's body type and other personal features as determined from the avatar. In particular, because some clothing may be more or less appropriate based on a person's height or weight, the electronic device may determine the clothing that is most appropriate for the user's avatar.

The electronic device can determine which clothing to recommend based on avatar attributes using any suitable approach. In some embodiments, different clothing can be associated with metadata defining body types. For example, each avatars can be associated with a predefined body type, where there are a pre-defined number of possible body types. As another example, each avatar can be associated with one or more body part types (e.g., lower body types and upper body types). Each article of clothing or accessory can be associated with avatar-type metadata using any suitable approach. For example, different manufacturers or retailers can associate the avatar-type metadata with each object that can be applied to an avatar. As another example, individual users can associate avatar-type metadata to articles of clothing, accessories, or other objects.

In some embodiments, the electronic device can instead or in addition recommend clothing or other objects based on the objects selected for purchase by other avatars having similar body types. In some embodiments, the avatars and objects purchased or tried on by users of each avatar can be catalogued and stored by the electronic device, or by a remote server accessible to each electronic device. For example, each electronic device can identify, for each avatar displayed by the electronic device, the particular objects applied to the avatar, or the particular objects purchased for the avatar, and provide the purchase information to the remote server. The remote service can receive and process information defining the objects viewed or purchased avatars from several electronic devices. Using an algorithm for determining the relative proximity of two or more objects, the electronic device, the remote server, or both can mathematically define a proximity value for each of the objects purchased for different avatars of electronic devices.

The algorithm can use any suitable attribute of the objects to determine the proximity value. For example, the algorithm can consider metadata attributes of the objects (e.g., item type, color, collection). As another example, the algorithm can process objects based on the avatars to which they were applied. In particular, the algorithm can identify, for each object applied to a particular avatar, the other objects applied to the same avatar. Because users having similar body types and tastes typically try on or purchase similar articles of clothing or objects, the algorithm can predict the similarity of objects without processing the attributes of the objects (e.g., define similarity without verifying that the collections are compatible). When the electronic device or remote server processes a large number of objects provided by a large number of users or distinct electronic devices for a large number of avatars, the electronic device or remote server can identify overlaps in the objects applied to individual avatars, and thus determine which sets of objects are most related.

Once the electronic device has identified the objects of most interest to the user, the electronic device can compare the identified objects with the objects available from retailers or suppliers. In particular, the objects available from each retailer or supplier can be provided to the electronic device or remote server processing the similarity between objects to determine the relative similarity of each of the objects sold by a retailer with the objects previously selected or purchased for a specific avatar. In some embodiments, the electronic device can directly compare objects from a retailer with previously purchased objects associated with a particular avatar to identify the overlapping objects. This in turn can allow the electronic device to recommend specific retailers or objects from similar retailers for the particular avatar.

To provide recommendations to the user, the electronic device can retrieve, from an appropriate source of proximity information (e.g., a remote server), information describing the proximity of the objects selected by the user for the user's avatar with the objects available from different retailers or other suppliers. In some embodiments, the electronic device can instead or in addition identify other retailers or suppliers having objects in common with the objects previously selected or purchased for the avatar. In particular, the electronic device can identify groupings, clusters or "buckets" of objects that are commonly applied to similar avatars (e.g., buckets of related clothing typically used by avatars associated with a particular body type). Using the buckets, the electronic device can identify the retailers or suppliers that have the most objects in buckets from which objects were previously applied to the user's avatar (e.g., the avatar's closet), and recommend the identified retailers or suppliers. In some embodiments, the electronic device can define buckets based only on a subset of the objects selected for a particular avatar, such as only evening wear, or swim wear (e.g., if information from other electronic devices is not available).

To ensure that the electronic device properly recommends retailers or suppliers based on the objects previously selected for an avatar, the electronic device can weigh each of the buckets differently. For example, each bucket weight can be incremented for each object of the avatar closet that is in a bucket (e.g., when several buckets are associated with the objects in an avatar closet). As another example, buckets can be weighed based on purchases of objects (e.g., as opposed to just trying on objects), the number of times an object is tried on (e.g., with different combinations of other accessories, or in different sizes), or based on any other suitable factor reflecting the objects of interest to the user. Correspondingly, the retailers or suppliers can be more or less attributed to buckets based on the number of objects available from the retailer or supplier, or on any other suitable factor reflecting the objects available from the supplier or retailer.

In some embodiments, the avatar can be combined with social networking applications. For example, a user can send his avatar to friends. If the user sends the avatar with a particular outfit, the user's friends can provide comments or recommendations. If the user sends the avatar without specific objects, the user's friends can generate proposed outfits for the user. Similarly, a user can receive from a friend the friend's avatar. The received avatar can then be used to virtually try on clothing or accessories before purchasing the clothing or other accessories.

Figures 5, 6:
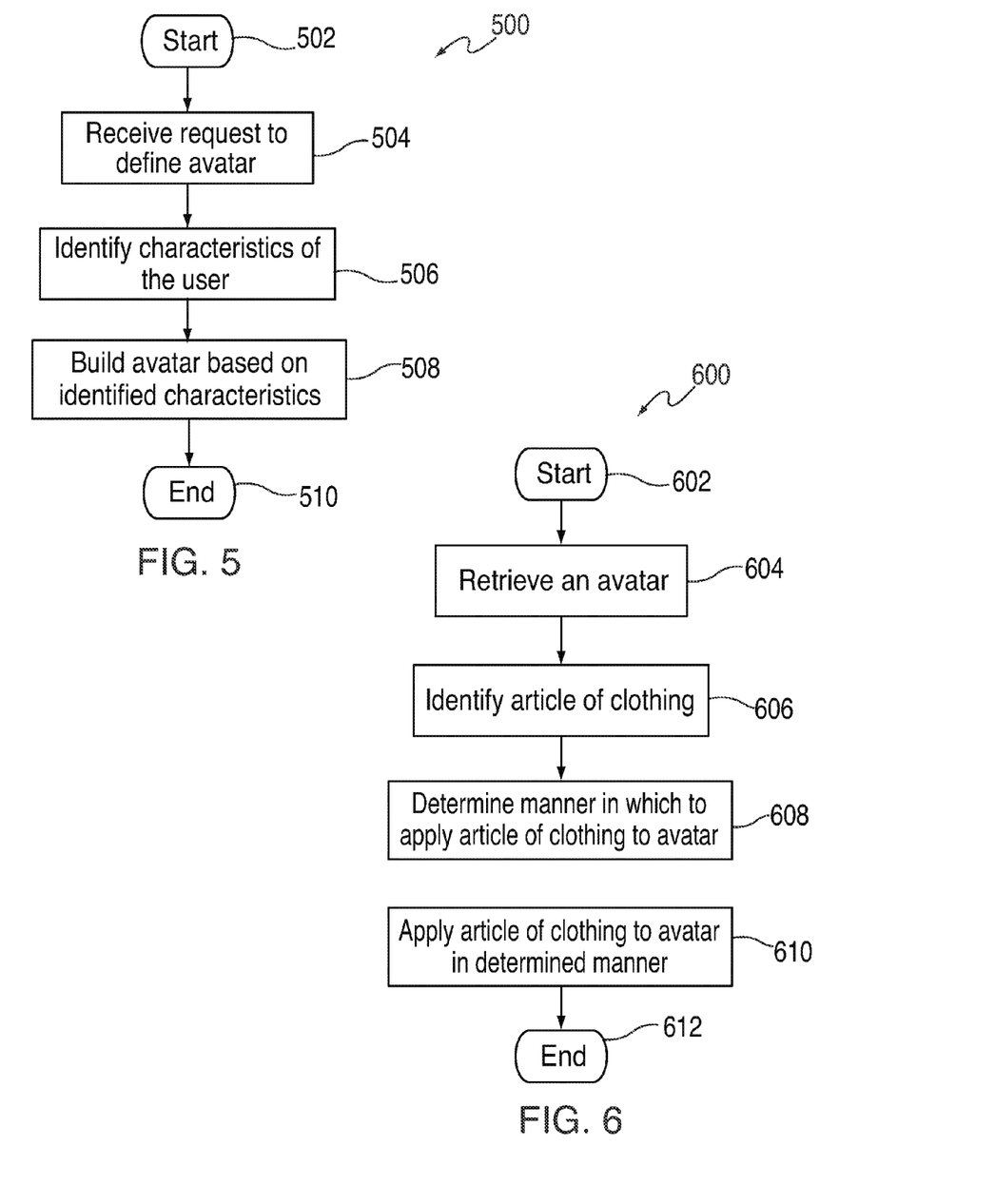
FIG. 5 is a flowchart of an illustrative process for defining an avatar in accordance with one embodiment of the invention.
FIG. 6 is a flowchart of an illustrative process for applying an article of clothing to an avatar in accordance with one embodiment of the invention.

FIG. 5 is a flowchart of an illustrative process for defining an avatar in accordance with one embodiment of the invention. Process 500 can begin at step 502. At step 504, the electronic device can receive a request to define an avatar. For example, the electronic device can receive, from an input interface, an instruction to define an avatar based on the user of the device. At step 506, the electronic device can identify characteristics of the user. For example, the electronic device can prompt the user to enter measurement information defining the body size and type of the user. As another example, the electronic device can prompt the user to take a photograph, or retrieve existing photographs of the user from which an avatar can be generated. At step 508, the electronic device can build an avatar based on the identified characteristics. For example, the electronic device can define a graphical representation of the user's body in which the proportions are selected to match the identified characteristics of the user. In some embodiments, the facial characteristics of the avatar can be selected to match those of the user, or the avatar can instead or in addition include one or more photographs of the user's face (e.g., use different photographs based on the perspective from which the user is viewing the avatar).

FIG. 6 is a flowchart of an illustrative process for applying an article of clothing to an avatar in accordance with one embodiment of the invention. Although the following discussion will be in the context of an article of clothing, it will be understood that any object or accessory that can be applied to an avatar can be used instead of an article of clothing. Process 600 can begin at step 602. At step 604, the electronic device can retrieve an avatar. For example, the electronic device can retrieve an avatar from memory or from a remote server. If several avatars are available to the electronic device, the device can receive a selection of the user's avatar, or can automatically select the user's avatar upon identifying the user. If the user has no avatar, the electronic device can prompt the user to generate a new avatar (e.g., using process 500, FIG. 5). At step 604, the electronic device can identify an article of clothing of interest. The article of clothing can be selected from any suitable source, including for example a manufacturer, retailer or supplier server or website. For example, a user can browse an on-line store, and select an article of clothing from the virtual store.

At step 608, the electronic device can determine the manner in which to apply the identified article of clothing to the avatar. For example, the electronic device can review or monitor metadata or other information associated with the identified article of clothing that specifies how to display the article of clothing on the avatar. The metadata can identify one or more specific portions or elements to be applied to corresponding portions of the avatar. For example, a shirt can include metadata identifying the shoulder and neck for aligning the shirt with the user's avatar. The article of clothing can in addition include metadata defining the manner in which the article of clothing will stretch or be draped over the avatar. At step 610, the electronic device can apply the article of clothing to the avatar in the determined manner. For example, the electronic device can display the avatar with the clothing applied to the avatar. If several articles of clothing are applied to the avatar simultaneously, the electronic device can determine how the several articles are layered. The user can move the avatar once the article of clothing has been applied to the avatar to view the article of clothing in different perspectives.

Although the preceding discussion describes avatars in the shapes of human beings, it will be understood that the principles of the embodiments described above can be applied to any three-dimensional object that the user would like to preview with an overlaid or applied object. For example, it will be understood that an avatar can be created for a pet or other animal (e.g., to preview a pet collar or pet clothing). As another example, an avatar can be created for inanimate objects (e.g., furniture) to preview the appearance of the object in a particular location, or to preview a second object being placed on or in the object (e.g., preview a couch when a person sits on it, or a cover for a sofa). As still another example, some embodiments can be applied in the context of medical fields, for example to preview the appearance of prosthesis on a user's avatar, or to preview the result of inserting a surgical object within a user (e.g., preview the appearance of a metal plate in a shoulder).

The above described embodiments of the invention are presented for purposes of illustration and not of limitation, and the present invention is limited only by the claims which follow.

What is claimed is:

1. A method for virtually previewing an article of clothing on a user, comprising:
  identifying a personalized avatar of the user, wherein the dimensions of the avatar substantially correspond to the user's dimensions;
  identifying a first article of clothing and a second article of clothing of interest to the user, wherein the first article of clothing and second article of clothing are characterized by a fabric of the article and a thickness of the fabric of the article;
  determining, by a processor, a tightness of the first article of clothing and a tightness of the second article of clothing;
  identifying a friction quantity associated with the first article of clothing and with the second article of clothing;
  applying, by a processor, the identified first article of clothing to an external surface of the identified avatar using an electronic device and applying the identified second article of clothing over the identified first article of clothing, wherein specific elements of the first article of clothing are positioned adjacent to corresponding specific elements of the avatar such that portions of the first article of clothing between the specific elements of the first article are draped in a manner reflecting the surface between the specific elements of the avatar and the tightness of the first article of clothing and the tightness of the second article of clothing;
  overlaying the identified second article of clothing at least in part over the identified first article of clothing, wherein the second article of clothing is offset from a surface of the avatar by an amount at least equal to the thickness of the fabric of the article;

displaying the avatar with the applied first article of clothing and second article of clothing using the electronic device;
receiving an instruction to move a portion of the avatar;
moving the portion of the avatar; and
revising, by a processor, the appearance of the applied first and second articles of clothing to reflect the movement of the portion of the avatar, wherein the second article of clothing moves relative to the first article of clothing by an amount determined from the friction quantity and from the tightness of the first article of clothing and the tightness of the second article of clothing.

2. The method of claim 1, further comprising:
determining whether the portions of the first article of clothing between the specific elements of the first article of clothing sag or stretch across the surface between the specific elements of the avatar.

3. The method of claim 1, further comprising:
retrieving the specific elements of the first article of clothing from metadata associated with the identified first article of clothing.

4. The method of claim 1, wherein:
the outer surface of the avatar is colored to match the user's skin color.

5. The method of claim 4, wherein:
the ratio of measurements of at least two components of the avatar substantially matches the ratio of measurements of the corresponding at least to components of the user.

6. The method of claim 5, wherein the measurements of at least two components comprise measurements of at least two of:
arm length;
leg length;
height;
waist circumference;
shoulder width;
neck circumference;
chest circumference;
bust length;
hip circumference;
thigh circumference;
calf circumference; and
head circumference.

7. The method of claim 1, further comprising:
providing the avatar with the first and second articles of clothing to a remote device for review.

8. A Non-transitory computer-readable media for virtually previewing an article of clothing on a user, comprising computer readable code recorded thereon for:
identifying a personalized avatar of the user, wherein the dimensions of the avatar substantially correspond to the user's dimensions;
identifying a first article of clothing and a second article of clothing of interest to the user, wherein the first article of clothing and second article of clothing are characterized by a fabric of the article and a thickness of the fabric of the article;
determining a tightness of the first article of clothing and a tightness of the second article of clothing;
identifying a friction quantity associated with the first article of clothing and with the second article of clothing;
applying the identified first article of clothing to an external surface of the identified avatar using an electronic device and applying the identified second article of clothing over the identified first article of clothing, wherein specific elements of the first article of clothing are positioned adjacent to corresponding specific elements of the avatar such that portions of the first article of clothing between the specific elements of the first article are draped in a manner reflecting the surface between the specific elements of the avatar and the tightness of the first article of clothing and the tightness of the second article of clothing;
overlaying the identified second article of clothing at least in part over the identified first article of clothing, wherein the second article of clothing is offset from a surface of the avatar by an amount at least equal to the thickness of the fabric of the article;
displaying the avatar with the applied first article of clothing and second article of clothing using the electronic device;
receiving an instruction to move a portion of the avatar;
moving the portion of the avatar; and
revising the appearance of the applied first and second articles of clothing to reflect the movement of the portion of the avatar, wherein the second article of clothing moves relative to the first article of clothing by an amount determined from the friction quantity and from the tightness of the first article of clothing and the tightness of the second article of clothing.

9. The computer-readable media of claim 8, comprising further computer readable code recorded thereon for:
determining whether the portions of the first article of clothing between the specific elements of the first article of clothing sag or stretch across the surface between the specific elements of the avatar.

10. The computer-readable media of claim 8, comprising further computer readable code recorded thereon for:
retrieving the specific elements of the first article of clothing from metadata associated with the identified first article of clothing.

11. An electronic device for previewing an article of clothing, comprising a display and control circuitry, the control circuitry operative to:
retrieve a personalized avatar, wherein shape of the avatar substantially corresponds to the shape of the user's body;
receive a selection of a first article of clothing and a second article of clothing, wherein the first article of clothing and second article of clothing are defined by a fabric, a thickness of the fabric of the article of clothing, and a plurality of contact points, wherein each contact point is associated with a specific element of the user's body;
determine a tightness of the first article of clothing and a tightness of the second article of clothing;
identify a friction quantity associated with the first article of clothing and with the second article of clothing;
apply the selected first article of clothing to the avatar and apply the identified second article of clothing over the identified first article of clothing, wherein the contact points of the first article of clothing and second article of clothing are substantially aligned with portions of the avatar corresponding to the specific elements of the user's body, and wherein an external surface of the article of clothing is offset from a surface of the avatar by an amount at least equal to the thickness of the fabric of the article of clothing;
direct the display to display the article of clothing applied to the avatar receive an instruction to move a portion of the avatar;
move the portion of the avatar; and
revise the appearance of the applied first and second articles of clothing to reflect the movement of the portion of the avatar, wherein the second article of clothing moves relative to the first article of clothing by an amount determined from the friction quantity and from the tightness of the first article of clothing and the tightness of the second article of clothing.

12. The electronic device of claim 11, wherein the control circuitry is further operative to:
   determine a distance between specific elements of the user's body;
   determine the amount of fabric between contact points of the article of clothing;
   compare the determined distance and the determined amount of fabric; and
   determine whether to stretch or let sag the determined amount of fabric based on the comparison.

13. The electronic device of claim 12, wherein the control circuitry is further operative to:
   define the orientation of gravity; and
   direct the fabric to sag in the defined gravity orientation.

14. The electronic device of claim 12, wherein the control circuitry is further operative to:
   retrieve at least one attribute of the fabric, wherein the attribute defines at least one of the texture and stiffness of the fabric; and
   adjust the manner in which the fabric lies over the avatar based on the retrieved at least one attribute.

15. The electronic device of claim 11, wherein the control circuitry is further operative to:
   receive a request to change the perspective of the avatar; and
   direct the display to display the avatar and the article of clothing from a different perspective.

16. The electronic device of claim 11, wherein the control circuitry is further operative to:
   receive a selection of a second article of clothing;
   apply the selected second article of clothing over the selected article of clothing, wherein an internal surface of the second article of clothing is offset from a surface of the avatar by an amount at least equal to the thickness.

* * * * *